Patented Jan. 21, 1930

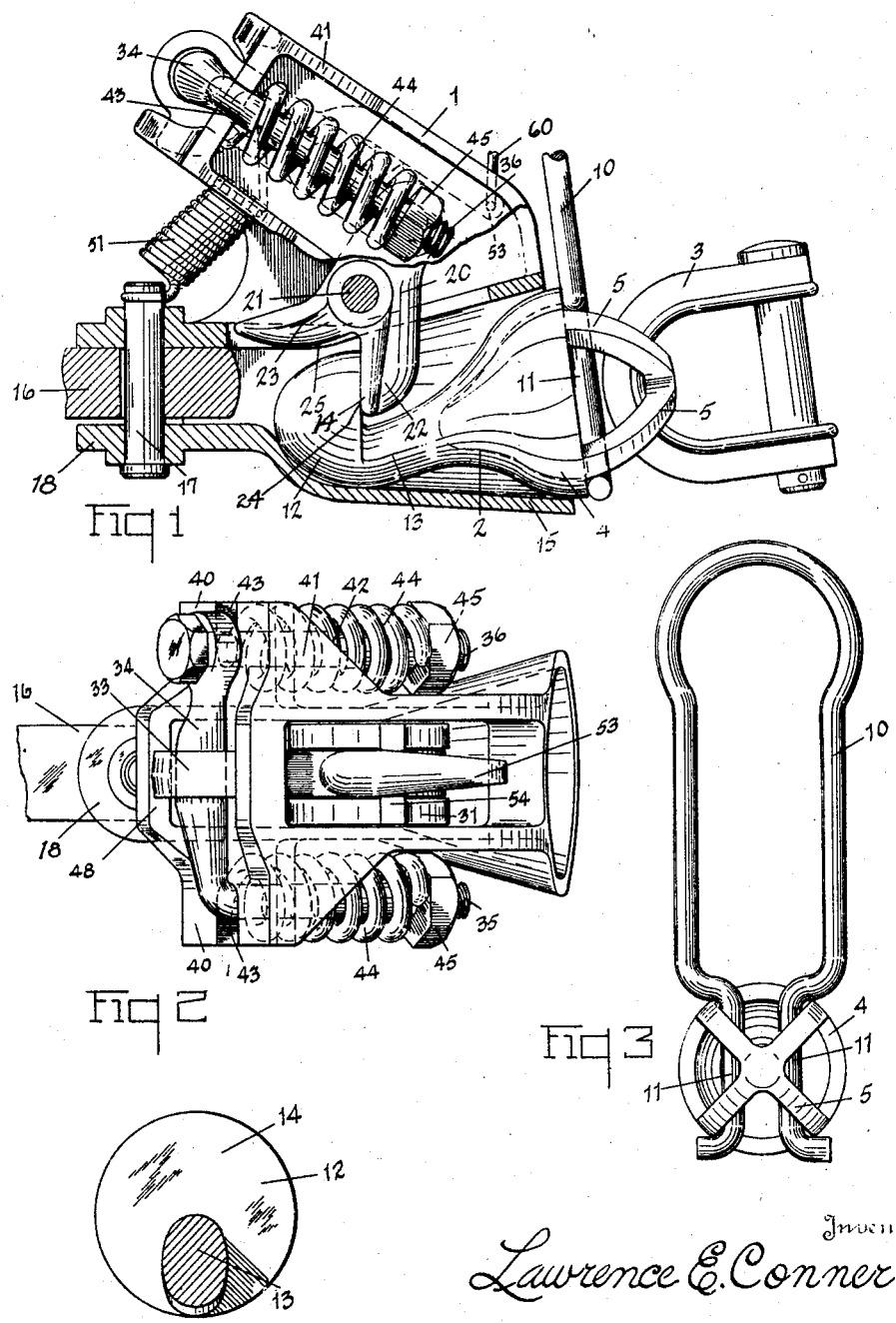

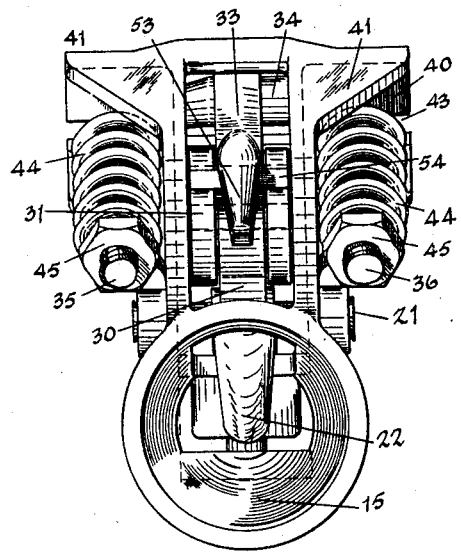
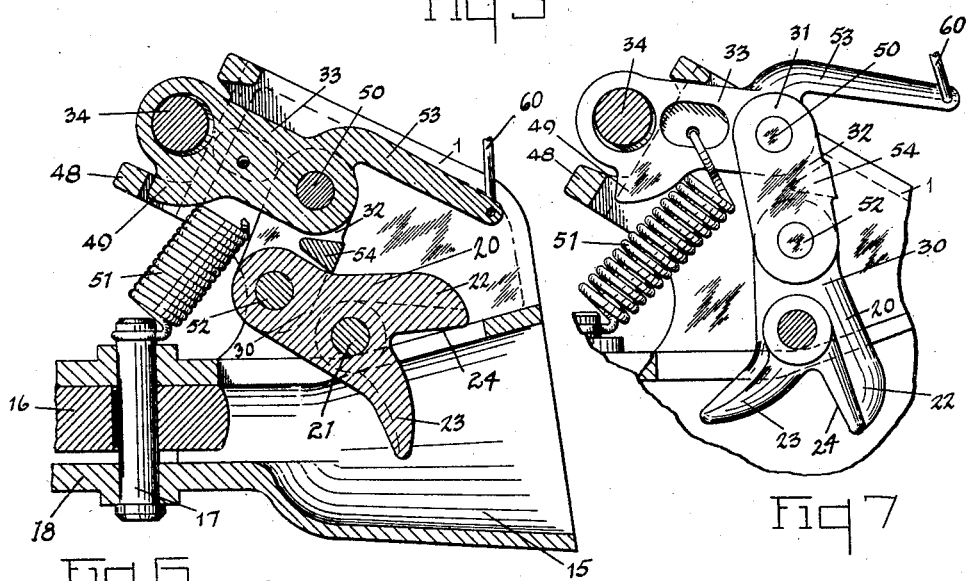
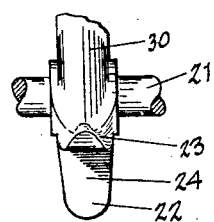

1,744,612

UNITED STATES PATENT OFFICE

LAWRENCE E. CONNER, OF JACKSON, MICHIGAN

DRAFT CONNECTER

Application filed February 26, 1927. Serial No. 171,096.

My invention has for its object to provide an automatic draft connecter that is so constructed that there will be certainty of automatic interlocking of the parts to be connected when brought together and also certainty of automatic disengagement when the draft exceeds a desired predetermined required force, means being provided for adjusting the disconnecting draft point of the connecter. The invention particularly provides an automatic toggle hitch that is durable, convenient in manipulation, and operates with certainty, both in connecting and disconnecting the parts that are to be joined by the hitch.

Structures containing the invention are for connecting together two movable members of any kind that are to be disconnected, particularly, when the load exceeds a desired predetermined amount, such as, when the following movable member is caught by an obstacle that would damage one or both of the members or parts thereof. Thus the invention finds a great advantage when used for drawing an implement, such as, an agricultural implement as, for example, a plow, whereby the plow will be automatically and instantaneously released and its forward movement discontinued immediately when the plow point strikes an object that, if continued in its movement, would break the plow point. Thus my invention provides an efficient implement protective means for readily connecting the implement to a tractor or other actuating means.

The invention may be contained in structures of different forms and to illustrate a practical application of the invention, I have selected a structure containing the invention, as an example of such structures, and shall describe it hereinafter. The structure selected is shown in the accompanying drawings.

Fig. 1 is a broken view of the hitch that is particularly adapted for connecting an agricultural implement to a tractor. A part of the hitch is shown in section in the figure. Fig. 2 is a top view of a part of the hitch. Fig. 3 illustrates a side view of a handle connected to a tongue. Fig. 4 is a view of a section across the tongue to show the engaging surface of the tongue. Fig. 5 is an end view of a part of the hitch. Fig. 6 is a view of a section of the part of the hitch showing a view of the locking member when the tongue has been released. Fig. 7 illustrates the position of the locking member as the hitch is manually operated to release the tongue. Fig. 8 illustrates the tongue engaging arm and shows the plane engaging surface of the locking member.

In the particular form of draft connecter selected as illustrative of embodiments of the invention and as shown in the drawings, the connecter or hitch 1 has a tongue 2 that may be connected to any form of device that is to be moved or drawn by power transmitter through the hitch, such as, to an agricultural implement having the clevis 3. The hitch 1, comprises a locking means and a tongue that is automatically secured in the locking means when the tongue is placed in contact therewith, and also means for automatically releasing the tongue when the draft exceeds a predetermined point.

The tongue has a hollow substantially ovate outer end 4 which is cut away to form a four legged spider for receiving the clevis 3. Thus the clevis may be inserted between either pair of legs 5 and thus may be normally located at a number of angles to the horizontal. The spider thus provides versatility of the arrangement of the parts.

The tongue is also provided with a handle 10 that may be located at points that vary 90 degrees to the axis of the tongue. The handle 10 is formed of a spring bar or rod that is bent substantially U-shaped and is provided with angular end portions 11 that are attached to engage the legs 5 of the spider and so as to lock the handle in any one of the four positions at right angles to the axis of the tongue. Thus the tongue may be located in any one of the four positions relative to the vertical by merely suspending the tongue, or the tongue may be located intermediate angular positions by turning the handle slightly with reference to the axis of the tongue and with reference to the vertical suspension line that the tongue would normally take when the handle is merely held by its upper end. The shape of the spider is such as to force the ends of the U-bar by reason of the elastic spread of the bar against the edge of the inner half of the hollow ovate end 4, and thus the handle and the tongue are held rigidly in relation to each other and the tongue may be readily manipulated by the handle. Thus the tongue may be readily placed in position for engagement by the locking means and the spider forms a convenient means for connecting the handle and the clevis, or other attaching means, in such a way that the tongue may be readily manipulated for locating it at any position for automatic connection of the hitch.

The tongue is provided with a head 12 that is semi-ovate in form and solid and much smaller than the ovate end 4. The ovate portions are connected together by means of the neck 13. The general contour of the tongue is conical in form which makes it easy of placement and penetration into locking relation in the hitch. The tongue is so formed that the neck protrudes integrally from one side portion of the semi-ovate head and enlarges into the larger ovate end 4. The head thus has a plane surface 14 which is the engaging and engaged surface when the tongue is locked in position. The neck 13 extending from a side portion of the head gives a broad area for engagement with the locking means and provides for liberal angular movement of the tongue.

In the form of construction shown, the tongue will be maintained in its locked position and yet may be turned to an angle of substantially 180 degrees. This, of course, will depend upon the width of the locking element that secures the tongue.

The hitch is provided with a means that cooperates with the shape of the tongue for guiding the tongue into its locking relation. In the form of construction shown the tongue is socketed and fits in a substantially conical shell 15, its opening being at its larger end. The large mouth of the shell thus provides a means for readily receiving the smaller end or head of the tongue and guiding it to its engaging and engaged position for establishing connection between the instruments that are to be connected by means of the hitch.

The shell is connected to either the implement or the actuating means by means of a draft bar 16 and a bolt 17 that extends through a housing or frame 18 which is formed, if desired, integral with the shell 15. The frame or housing is provided with a means for engaging the head of the tongue. In the form of construction shown a pivoted fork 20 is pivotally supported on a pin 21. The fork 20 has a tongue engaging arm 22 and a tongue ejector and lock setting arm 23. The engaging arm 22 has a plane surface 24 which, when the tongue is in position in the shell and the fork is in locking position, sets squarely against the plane surface 14 of the tongue. This provides a large area of contact as between the tongue and the locking means which distributes the wear between these elements in the use of the instrument when the draft force is transmitted through the instrument. The tongue ejector and lock setting arm 23 has a rounded surface as at 25 which coacts with the rounded surface of the ovate head of the tongue to readily eject the tongue when the fork is turned in one direction and to readily rotate the fork so as to place the engaging arm 22 in position to engage the head 12 of the tongue. The two rounded surfaces thus readily slide one upon the other, either in the ejectment of the tongue or in the setting of the locking mechanism.

The locking mechanism is so constructed that the fork member will be turned with a snap into engaging relation of the tongue and also turned with a snap to give prompt and quick ejectment of the tongue when the draft exceeds a predetermined point in the force that is transmitted. The pivoted fork has an arm 30 that is connected to a toggle 31 that comprises the links 32 and 33. The other end of the toggle 31 is connected to a cross member 34 that may terminate in a bolt 35 located on one side of the hitch and may be connected to a bolt 36 located on the other side of the hitch. The link 33 has an opening somewhat larger than the diameter of the cross member 34 for purposes of assembly. The end that forms the bolt 35 is inserted through the opening on the end of the toggle, namely, the end of the link 33, and then placed in position with respect to the frame. The bolt 36 may then be inserted through the end of the cross member. The frame 18 is provided with a pair of laterally extending flanges 40 and four webs that connect the end of the flanges to the body part of the frame or housing. The webs 41 have sloping edges 42 and the flanges and the webs form a recess in which the bolts 35 and 36 may be located. The flanges 40 are provided with slots 43 through which the bolts extend. Heavy duty compression springs 44 are located on the bolts 35 and 36 and are adjustably pressed against the flanges 40 by the nuts 45 that are threaded on the ends of the bolts 35 and 36. The springs 44 yieldingly resist movement of the cross member 34 produced by the force of the draft, produced either by the tongue 2 or the draft bar 16. When the toggle is in position so as to lock the tongue 2 in position, the force of the draft bar 16 will be transmitted to the frame or housing 18 and the fork 20 will be held in its engaging relation to the tongue 2 by the springs 44. When, however, the force thus transmitted exceeds a predetermined point, as determined by the setting of the compression springs 44 by the nuts 45, means is provided for breaking the toggle and not only permitting releasement of the tongue, but also for causing the tongue to be kicked or quickly ejected from the shell 15.

The frame 18 is provided with a bridge 48 and the link 33 is provided with a lug 49 that is located on one side of the link. The bridge 48 forms a stop that is engaged by the lug 49 when the movement is sufficiently great to overcome the pressure of the springs between the flanges 40 and the nuts 45. This will tilt the link 33 upward and raise its center of connection with link 32 above the line of the centers of the toggle and by reason of the pressure of the springs 44 the toggle will be immediately broken. This will permit the member 30 to turn on its pivot pin 21 and will turn the arm 30 of the fork member 20 between the line of the centers of the pivot pin 21 and the connecting pin 50 of the toggle which will completely release the tongue 2 from engagement with the arm 22 of the fork member. In order to further rotate the fork member 20, a spring 51 is connected to the link 33 of the toggle and to a fixed part of the frame 18, such as, to the upper end of the pin 17. When, therefore, the link 32 is swung so as to move the point of connection between the fork member 20 and the link member 32 on the inside of the line of connection between the centers of the pin 50 and the pin 21, the spring 51 will operate upon the links of the toggle so as to pull the arm 30 of the fork member down with a snap and cause the ejector arm 23 to kick out the tongue 2 from the shell 15. This will leave the parts in position substantially as shown in Fig. 6.

When it is desired to connect the instruments through the hitch, the tongue 2 is inserted in the socket 15, the head 12 will press against the arm 23 and cause the fork member to rotate on its pin 21 which lifts the toggle links against the yielding action of the spring 51, and until the connected pin 52 passes between the pins 21 and 50, whereupon the tension spring 51 will snap the links 32 and 33 in position so as to bring the centers of the toggle substantially in alignment. This movement of the links 32 and 33 relative to each other is limited by the arm 53 that extends from the link 33 and the bridge 54 that operates as a stop to the movement of the arm 53, and when these two parts, namely, the arm 53 and the bridge 54, engage with each other those within the toggle, namely, the centers of the cross member 34, the pin 50 and the pin 52 are substantially in alignment. If desired, the pin 50 may be located slightly below the line of the centers of the toggle or the pin 50 may be located slightly above the line of centers of the toggle, or at any intermediate position, since the spring 51 will operate as yielding resistance to the upward swing of the link 33 as produced by the engagement of the lug 49 against the bridge 48 which causes the breaking of the toggle and the releasement of the tongue. Thus by my invention I have provided an efficient structure for interconnecting two parts that are drawn one by the other and particularly a structure that may be advantageously used in connection with draft appliances. The interconnecter has means for maintaining a large area of contact as between the interengaging parts and also a releasing means which operates so quickly as to prevent any wear on the engaging surfaces in advance of the releasement. Any movement of the fork member from its engagement through the plane surfaces of the member and the tongue, is a movement of releasement of the tongue and terminates in the ejectment of the tongue. A link 60 may be connected to the end of the arm 53 to manually operate the toggle and eject the tongue by the movement of the forked member 20.

I claim:

1. In a draft connecter, a substantially conical shell, a substantially conical tongue socketed in the shell, the tongue having a plane engaging surface, a member for engaging the tongue and having a plane engaging surface, the said plane located at right angles to the axes of the tongue and the shell, the said tongue and the said member interengaging by contact of the plane surfaces.

2. In a draft connecter, a substantially conical shell, a substantially conical tongue, insertable in the shell and having an ovate end, the said end having a spider conforming substantially to the ovate shape and means for engaging the tongue in the shell.

3. In a draft connecter, a substantially conical shell, a substantially conical tongue insertable in the shell and having an ovate end, the said end having a spider conforming substantially to the ovate shape, an elastic U-shape having bent portions fitting the legs of the spider and removably connected to the ovate end by elastic engagement of the ends of the legs of the spider and means for engaging the tongue in the shell.

4. In a draft connecter, a shell, a tongue located in the shell and having a hollow ovate outer end, a spider having legs conforming substantially to the ovate shape of the outer end, an elastic U-bar having end portions bent to fit and elastically engage the legs of the spider.

5. In a draft connecter, a shell, a tongue located in the shell, the outer end of the tongue being ovate in form, a spider conforming substantially to the ovate form of the outer end of the tongue and an elastic U-bar having bent end portions for engaging with the legs of the spider.

6. In a draft connecter, a tongue having a plane engaging surface, a forked engaging member one leg of the fork having a plane engaging surface, the said tongue engaging the other leg of the fork to place the engaging plane surface of the fork in contact with and in engagement with the plane surface of the tongue and means for yieldingly resisting the movement of the forked member.

7. In a draft connecter, a tongue, a pivoted engaging member for engaging the tongue, a toggle connected to the pivoted member, springs connected to the toggle and stops for breaking the toggle on movement of the toggle along substantially the centers of the toggle.

8. In a draft connecter, a tongue, a pivoted engaging member for engaging the tongue, a toggle connected to the pivoted member, springs connected to the toggle, stops for breaking the toggle on movement of the toggle along substantially the centers of the toggle and a retractile spring for rotating the engaging member.

9. In a draft connecter, a tongue, a pivoted forked member having one arm for engaging the tongue, another arm for ejecting the tongue, a toggle connected to the pivoted member, springs connected to the toggle, means for breaking the toggle on movement of the toggle substantially along the line of the centers of the toggle and for ejecting the tongue by rotation of the member, a retractile spring for further rotating the member upon breaking of the toggle for causing the ejecting arm of the member to eject the tongue.

10. In a draft connecter, a substantial conical shell, a substantial conical tongue socketed in the shell, a pivoted forked engaging member having an arm for engaging the tongue in the shell, an arm for ejecting the tongue from the shell, a toggle connected to the pivoted member, springs connected to the toggle, means for breaking the toggle on movement of the toggle substantially along the line of the centers of the toggle to cause rotation of the pivoted member, to release the tongue and a retractile spring for rotating the pivoted member to eject the tongue.

11. In a draft connecter, a substantially tapering shell, a substantially tapering tongue socketed in the shell, a pivoted forked engaging member having an arm for engaging the tongue in the shell, an arm for ejecting the tongue from the shell, a toggle connected to the pivoted member, springs connected to the toggle, means for breaking the toggle on movement of the toggle substantially along the line of the centers of the toggle to cause rotation of the pivoted member, to release the tongue and a retractile spring for rotating the pivoted member to eject the tongue.

In witness whereof, I have hereunto signed my name to this specification.

LAWRENCE E. CONNER.